O. KAMPFE.
EYEGLASSES.
APPLICATION FILED JAN. 2, 1908.
899,409.
Patented Sept. 22, 1908.
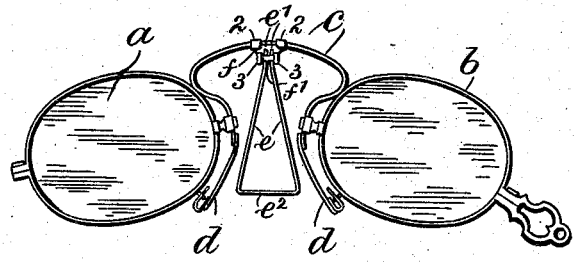
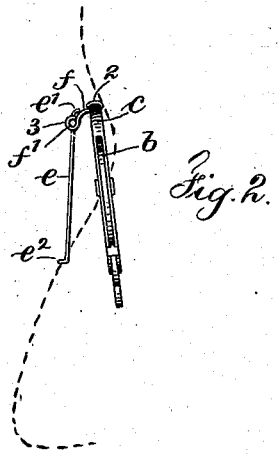
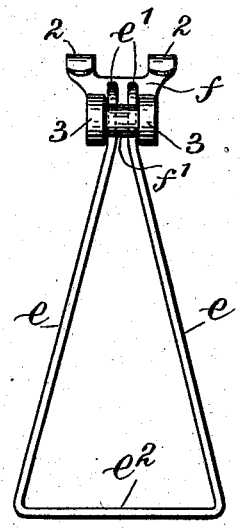
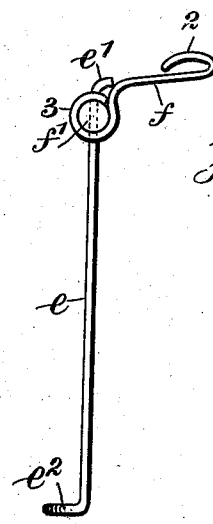
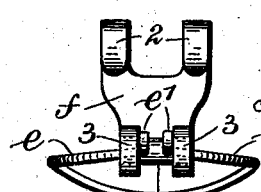
Inventor.
Otto Kampfe
by Harold Serrell
his atty

UNITED STATES PATENT OFFICE.

OTTO KAMPFE, OF NEW YORK, N. Y.

EYEGLASSES.

No. 899,409.  Specification of Letters Patent.  Patented Sept. 22, 1908.

Application filed January 2, 1908. Serial No. 409,073.

*To all whom it may concern:*

Be it known that I, OTTO KAMPFE, a citizen of the United States, residing at the borough of Brooklyn, in the county of Kings, city and State of New York, have invented an Improvement in Eyeglasses, of which the following is a specification.

My invention relates to a device the function of which is to assist in maintaining or in other words insuring eyeglasses remaining in place on the nose of the wearer.

Heretofore many forms of holding-on devices have been used with more or less satisfactory results; those devices holding best however, leaving unsightly and often injurious marks on each side of the nose as the result of considerable pressure. The tendency of these holding-on devices or nose-pieces is to rise on the nose because of its tapering form and to loosen their grip with the rising movement, there being a tendency with this rising movement to throw the upper portion of the glasses forward, and the object of my invention is to prevent this rising movement by a pressure in another direction and thus assist in keeping the glasses to their place without undue pressure.

In carrying out my invention, I provide a triangular or V-shaped frame, a plate with clips to engage the spring bow of the eyeglasses and with hinge-lugs surrounding the ends of a hinge pin; the free ends of said frame as brought together passing through holes in the hinge pin and beyond so as to bear under the tension of use upon the upper surface of said plate, while the lower free end of said frame bears upon the bridge of the nose, all of which is hereinafter more particularly set forth.

In the drawing, Figure 1 is an elevation showing eyeglasses with the device of my improvement attached thereto. Fig. 2 is a side elevation, a portion of the profile of a face being shown by dotted lines. Fig. 3 is an elevation, Fig. 4 a side view and Fig. 5 a plan of the device constituting my invention by itself and in larger size than is shown in Figs. 1 and 2.

Referring particularly to Figs. 1 and 2, *a b* represent the eyeglasses connected together by a spring bow *c* of usual form and provided with nose-pieces *d* of any desired construction, as the device of my improvement is adapted for attachment to the spring bow of eyeglasses of any style.

In the particular device constituting my improvement I employ a wire frame of inverted V-shape composed of a curved base or member $e^2$ and converging members *e e*, a plate *f* formed of approximately the shape shown in Figs. 3, 4 and 5, with clip ends 2 and hinge lugs 3. The clips 2 are preferably curved in their upper parts to spring over and embrace the spring bow *c* of the eyeglasses as shown in Figs. 1 and 2. The hinge lugs 3 are adapted to receive a hinge pin $f^1$ through which holes are provided to receive the free ends $e^1$ of the V-shaped frame and which free ends not only extend through but beyond the hinge pin $f^1$ sufficiently to bear upon the surface of the plate *f* when in use, and especially when bent over slightly toward the plate. It will thus be apparent that it is possible to swing the said frame and plate toward one another in their line of nearest proximity, but not to move them in an opposite direction because of the bearing of the bent free ends $e^1$ of the inverted V-shaped wire frame; consequently when the frame is attached to the spring bow of the eyeglasses and the lower curved base bears upon the bridge of the nose, as shown in Fig. 2, the tendency is to force the spring bow toward the face at the upper part of the nose and to cause a pressure against opposite sides of the bearing of the nose pieces upon the sides of the nose which acts to overcome the tendency of the nose pieces to rise on the nose because of its curvature.

I have found by use and practical demonstration that this device is exceedingly efficient in keeping the eyeglasses not only in place with a firm seat but preventing any lengthwise or lateral swinging movement that might be due to the motion of the body or to the action of wind when the glasses are worn out of doors,—thus making the glasses very steady in position and providing a firmer grip on the nose than is possible with the same nose pieces without the frame.

I claim as my invention:

1. A device of the character described, as an attachment to eyeglasses, having a spring bow and the usual nose grips; the same comprising a removable spring clip to engage the spring bow of the eyeglasses, and a part connected thereto and extending therefrom and adapted at its free end to bear upon the bridge of the nose of the wearer.

2. The combination with eyeglasses having a spring bow and the usual nose grips, of a device comprising a clip member to engage the spring bow and a frame member movably mounted upon the clip member and extending therefrom to a bearing upon the bridge of the nose.

3. The combination with eyeglasses having a spring bow, of a device comprising a plate provided with clips adapted to embrace the spring bow of the eyeglasses, a wire frame and a pivotal connection between the wire frame and the said plate, the end of the wire frame adapted to rest upon the bridge of the nose and inflexible in the line of pressure.

4. The combination with eyeglasses having a spring bow, of a device comprising a plate having clip members at one edge and horizontal lugs at the other, a hinge pin passing through the hinge lugs, a wire frame of inverted V-form having a curved base adapted to rest over the bridge of the nose, the free ends of said wire frame passing through holes in the hinge pin and beyond the hinge pin so as to bear upon the upper surface of the plate and render the co-acting relation of the two parts inflexible in one direction which is the direction of pressure and use.

Signed by me this 27th day of December 1907.

OTTO KAMPFE.

Witnesses:
　Geo. T. Pinckney,
　E. Zachariasen.